United States Patent [19]
Araujo et al.

[11] 3,923,529
[45] Dec. 2, 1975

[54] SODALITE-RELATED GLASS COMPOSITIONS FOR PRODUCTION OF PHOTOCHROMIC AND FLUORESCENT ARTICLES

[75] Inventors: Roger J. Araujo, Corning; George H. Beall, Big Flats; Loris G. Sawchuk, Corning, all of N.Y.

[73] Assignee: Corning Glass Works, Corning, N.Y.

[22] Filed: Jan. 10, 1975

[21] Appl. No.: 540,169

[52] U.S. Cl. ............... 106/52; 106/39.6; 106/39.7; 106/47; 106/54; 106/DIG. 6; 252/301.4 F
[51] Int. Cl.² ... C03C 3/04; C03C 3/08; C03C 3/12; C03C 3/22
[58] Field of Search ............ 106/DIG. 6, 39.6, 39.7, 106/47, 52, 54

[56] References Cited
UNITED STATES PATENTS

| | | | |
|---|---|---|---|
| 3,255,120 | 6/1966 | Cohen | 106/52 |
| 3,649,311 | 3/1972 | Araujo | 106/54 |
| 3,673,049 | 6/1972 | Giffen et al. | 106/54 |
| 3,674,455 | 7/1972 | Dugger | 106/47 Q |
| 3,689,293 | 9/1972 | Beall | 106/54 |
| 3,760,063 | 9/1973 | Dreyfus | 252/301.4 F |
| 3,764,354 | 10/1973 | Ritze et al. | 106/54 |

*Primary Examiner*—Helen M. McCarthy
*Attorney, Agent, or Firm*—Kees van der Sterre; Clinton S. Janes, Jr.; Clarence R. Patty, Jr.

[57] ABSTRACT

Compositions comprising sodium oxide and optionally other alkali metal oxides, a glass network-forming oxide such as $SiO_2$ or $GeO_2$, a modifying oxide such as $Al_2O_3$ or $Ga_2O_3$, a halogen such as Cl or F, and an electron donor constituent such as sulfur, selenium or tellurium, are melted to form glasses which may be reversibly photochromic, and are thermally crystallized to form glass-ceramics comprising sodalite or analogous crystal phases which are also reversibly photochromic. The glasses and glass-ceramics may also exhibit induced fluorescence in the activated (darkened) state.

4 Claims, No Drawings

SODALITE-RELATED GLASS COMPOSITIONS FOR PRODUCTION OF PHOTOCHROMIC AND FLUORESCENT ARTICLES

BACKGROUND OF THE INVENTION

The photochromic behavior of sodalite ($Na_6Al_6Si_6O_{24} \cdot 2NaCl$), a cubic crystalline sodium aluminosilicate which occurs in nature as a crystal having definite blue coloration, has long been of interest. U.S. Pat. NO. No. 2,761,846 discloses that the blue color of naturally-occuring sodalite can be removed by heating, and that color can be restored by exposure to X-rays. The patent further teaches a method of manufacturing synthetic pink sodalite (hackmanite) which will darken upon exposure to ultraviolet radiation and which may be bleached by visible light. U.S. Pat. No. 3,598,750 teaches that sodalite also exhibits cathodochromic behavior, and that the sensitivity of the material to cathode rays may be enhanced by the addition of iron to sodalite crystals.

Improvements in the cathodochromic behavior of sodalite are obtained in accordance with U.S. Pat. No. 3,705,323 by controlled heating of sodalite crystals to create sodium chloride vacancies in the crystal structure by volatilization.

A variety of methods for preparing synthetic sodalites are known. For example, U.S. Pat. No. 3,760,063 teaches a method of preparing synthetic sodalite by heating certain zeolite-alkali halide mixtures, and U.S. Pat. No. 3,773,540 teaches the preparation of finely-divided sodalite by a hydrothermal technique. However, to our knowledge, all prior art methods of producing synthetic sodalites involve crystal growth techniques wherein glassy products of fusion are specifically avoided. Thus the utilization of the photochromic and/or cathodochromic properties of the sodalites in image display and storage devices such as dark trace cathode ray tubes has required the utilization of polycrystalline sodalite powders to provide coatings, screens or compacted articles useful for the intended purpose.

Photochromic glasses exhibiting darkening upon exposure to ultraviolet radiation and loss of darkening upon cessation of exposure are also known. Thus U.S. Pat. No. 3,208,860 to Armistead and Stookey describes silicate glasses incorporating dispersed submicroscopic crystals of a silver halide which exhibit reversible photochromic darkening without fatigue.

SUMMARY OF THE INVENTION

We have now discovered glass-forming compositions related to the crystalline sodalite minerals found in nature which exhibit reversible photochromic properties in the amorphous or semicrystalline state. Certain glasses within our composition system exhibit photochromic darkening on exposure to short wavelength ultraviolet radiation, and optical bleaching on exposure to longer wavelength radiation. These and other glasses within our composition system can be heat-treated according to specified time-temperature schedules to induce internal crystallization therein, thus to provide semicrystalline photochromic articles comprising sodalite or analogous crystal phases which are also darkenable upon exposure to ultraviolet radiation and bleachable using longer wavelength light.

Glass compositions useful for providing photochromic glasses or glass-ceramics in accordance with the present invention comprise, as essential constituents, a network-forming oxide such as $SiO_2$ or $GeO_2$, a network-modifying oxide such as $Al_2O_3$ or $Ga_2O_3$, an alkali metal oxide such as $Na_2O$ or, in addition, $K_2O$ or $Cs_2O$, a halogen such as chlorine or fluorine, and an electron donor constituent such as sulfur, tellurium or selenium.

Photochromic glass-ceramic articles made in accordance with the invention comprise photochromic crystallites of a structure analogous to sodalite ($Na_6Al_6Si_6O_{24} \cdot 2NaCl$), but of the more general composition:

$M_6^{+1} M_6^{+3} M_6^{+4} O_{24} \cdot 2M^{+1}X$ wherein $M^{+1}$ is Na, which may be partially replaced by $K^{+1}$ or $Cs^{+1}$, $M^{+3}$ is $Al^{+3}$ or $Ga^{+3}$, $M^{+4}$ is $Si^{+4}$ or $Ge^{+4}$, and X is $Cl^{-1}$ or $F^{-1}$.

More specifically, our invention comprises glass compositions, useful for the production of photochromic glass and glass-ceramic articles, having compositions comprising, in weight percent as calculated from the batch, about 17–34% total of alkali metal oxides, essentially including $Na_2O$, selected in the indicated proportion from the group consisting of 12–33% $Na_2O$, 0–20% $K_2O$ and 0–7% $Cs_2O$; 17–33% total of network-modifying oxides selected from the group consisting of $Al_2O_3$ and $Ga_2O_3$; and 22–54% total of network-forming oxides selected in amounts not exceeding the indicated proportions from the group consisting of up to 41% $SiO_2$ and up to 54% $GeO_2$; 2.5–30% total of halogens selected in amounts not exceeding the indicated proportions from the group consisting of up to 9% F and up to 30% Cl; and 1–10% total of electron donor constituents selected from the group consisting of $SO_3$, $SeO_2$ and Te. The foregoing oxide, halogen and electron donor constituents should comprise at least about 85% by weight of the glass.

All compositions within the above-described composition region provide glasses which are at least potentially photochromic in that they may be heat treated to provide photochromic glass-ceramics containing sodalite or analogous crystal phases therein. However, certain of these compositions provide glasses which are photochromic as formed, although no crystals can be detected therein by conventional examination techniques. In general, glasses which are photochromic as formed are those within the above-described composition region which comprises 5–10% total of the electron donors sulfur, calculated as $SO_3$, selenium, calculated as $SeO_2$ and tellurium, calculated as Te, all as calculated from the batch.

The heat treatment of glasses of appropriate composition to provide semicrystalline glass-ceramic articles therefrom is known. U.S. Pat. No. 2,920,971 provides the basic teachings concerning the practices applicable to this comparatively recent advance in the glassmaking art. However, these teachings have not been applied to the production of glass-ceramics containing photochromic sodalite crystals.

We have found that glasses having compositions as hereinabove described, whether or not photochromic as formed, may be cyrstallized to light-colored, fine-grained, photochromic glass-ceramics by initially heating the glass in a nucleation range for a time sufficient to provide the necessary crystal nuclei throughout the glass, and thereafter further heating the glass at a temperature in a crystallization range for a time sufficient to promote crystal growth on the crystal nuclei and complete the crystallization of the glass. The inclusion of conventional nucleating agents such as $TiO_2$ or $ZrO_2$ in the glass is not required to achieve crystallization, although such agents may optionally be utilized to modify crystallization behavior if desired.

Photochromic glasses produced in accordance with the invention are typically clear but with a brown coloration, shifting towards a gray coloration upon darkening with ultraviolet radiation. Photochromic glass-ceramics are typically white and opaque, darkening to gray upon exposure to ultraviolet radiation.

The capability of utilizing conventional glass-forming methods to produce photochromic sodalite and sodalite-related glasses and glass-ceramics in a multiplicity of sizes and configurations is a substantial advantage of the invention, since the fabrication of useful photochromic articles utilizing prior art polycrystalline sodalites was difficult.

In addition, many of our photochromic glasses and glass-ceramics exhibit an induced fluorescence after exposure to activating short-wavelength ultraviolet radiation which has not previously been observed in sodalite systems. This induced fluorescence is useful for a variety of display and other information processing applications.

DETAILED DESCRIPTION

In genral, compositions within the described composition range may be melted to form glasses in accordance with conventional melting practice in tanks, pots or crucibles at temperatures in the range of 1400°–1500°C. However, volatilization of the halogens and electron donor constituents, particularly sulfur, can occur to a substantial degree, with losses of up to 80% or more of the batch additions of these constituents being incurred under some circumstances. Therefore we prefer to utilize covered melting vessels and melting temperatures at the lower extreme of the melting range to maximize the retention of volatile species in the glass. Also, fluorides aid greatly in melting the glasses at low temperatures, thereby minimizing the problem of retention of volatiles. This factor increases the importance of our discovery that crystals of sodalite structure can be grown in glasses wherein fluorine is the only halogen. Surprisingly, reducing conditions of the kind required in the production of prior art photochromic synthetic sodalites are not required during the melting of our glasses.

Glass articles of the disclosed compositions may be formed utilizing conventional glass-forming techniques such as pressing or casting, and may be annealed at conventional temperatures without affecting photochromic behavior.

Preferred heat temperatures for the production of photochromic glass-ceramics from glasses produced as above described comprise heating the glass to a temperature in a nucleation range of about 550°–650°C. and maintaining it in that range for 3–6 hours, and thereafter further heating the glass to a temperature in a crystallization range of about 800°–900°C. and maintaining it in that range for 3–6 hours, followed by cooling to room temperature. Glass-ceramics produced by this process are typically fine-grained and highly crystalline.

Table I below records compositions for glasses and glass-ceramics in accordance with the invention, some glasses being photochromic as formed and all being photochromic after heat treatment to obtain glass-ceramic articles therefrom. Compositions are shown in approximate percent by weight as calculated from the batches for each glass, being reported on the oxide basis except for tellurium and the halogens which are reported on an elemental basis as calculated from the batch.

Batch materials for the compositions shown in Table I may comprise any constituents, whether oxides or other compounds, which will yield the components shown for the compositions at the temperature utilized for melting the batch. Because low melting temperatures are preferred to maximize the retention of volatile constituents in the glass, readily-fusible batch ingredients which aid in achieving homogeneous melts at reduced temperatures are employed where possible. Fluoride compounds and sodium aluminate are examples of batch ingredients useful for this purpose. Typically, the batch ingredients are ball-milled prior to melting to insure homogeneity in the glass product.

TABLE I

| Example No. | 1 | 2 | 3 | 4 | 5 | 6 | 7 | 8 | 9 | 10 |
|---|---|---|---|---|---|---|---|---|---|---|
| $SiO_2$ | 24.2 | 40.2 | 32.9 | 36.1 | 35.4 | 33.5 | 32.9 | 38.1 | 30.7 | 27.3 |
| $GeO_2$ | | | | | | | | | | |
| $Al_2O_3$ | 20.4 | 18.2 | 27.9 | 30.6 | 29.9 | 28.4 | 27.7 | 32.0 | 26.0 | 27.8 |
| $Ga_2O_3$ | | | | | | | | | | |
| $Na_2O$ | 25.8 | 32.9 | 29.3 | 24.3 | 27.6 | 26.1 | 13.9 | 16.1 | 24.6 | 17.4 |
| $K_2O$ | | | | | | | 19.3 | | | 19.2 |
| $Cs_2O$ | | | | | | | | 6.7 | | |
| F | | | 5.2 | 2.9 | 5.6 | 5.3 | 5.2 | 6.0 | 4.9 | 7.4 |
| Cl | 28.5 | 7.8 | | | | | | | | |
| $SO_3$ | 1.0 | 0.9 | 4.7 | 1.0 | | | 1.0 | 0.9 | 0.9 | 0.9 |
| $SeO_2$ | | | | | 1.4 | | | | | |
| Te | | | | | | 6.8 | | | | |
| $B_2O_3$ | | | | 5.0 | | | | | 12.8 | |
| ZnO | | | | | | | | | | |
| CdO | | | | | | | | | | |

| Example No. | 11 | 12 | 13 | 14 | 15 |
|---|---|---|---|---|---|
| $SiO_2$ | 29.9 | 29.9 | 14.2 | | |
| $GeO_2$ | | | 31.7 | 54.0 | 46.5 |
| $Al_2O_3$ | 25.2 | 25.2 | 24.9 | 21.2 | |
| $Ga_2O_3$ | | | | | 32.2 |
| $Na_2O$ | 27.1 | 27.1 | 23.6 | 20.1 | 17.2 |
| $K_2O$ | | | | | |
| $Cs_2O$ | | | | | |
| F | 4.7 | 4.7 | 4.7 | 4.0 | 3.4 |
| Cl | | | | | |
| $SO_3$ | 4.7 | 4.7 | 0.8 | 0.7 | 0.6 |
| $SeO_2$ | | | | | |
| Te | | | | | |
| $B_2O_3$ | | | | | |
| ZnO | | 8.4 | | | |

TABLE I-continued

| Example No. | 1 | 2 | 3 | 4 | 5 | 6 | 7 | 8 | 9 | 10 |
|---|---|---|---|---|---|---|---|---|---|---|
| CdO | | 8.4 | | | | | | | | |

Batches having compositions as shown in Table I are melted in covered crucibles at 1400°C. in a 6 hour interval and are then cast into metal molds to form glass plates about one-fourth inch in thickness. These plates are then annealed at 500°C. and slowly cooled to room temperature.

Certain of the glass plates are photochromic as formed, while others are subjected to thermal crystallization heat treatments to obtain photochromic glass-ceramics comprising sodalite or related crystal phases. The heat treatments which are utilized for this purpose comprise initial heating to the glass to a nucleation temperature of about 600°C. and holding for 4 hours followed by subsequent heating of the nucleated glass to 800°C and holding for 4 hours to obtain crystallization thereof. The glass-ceramic products of this process are photochromic and highly crystalline.

The photochromic darkening behavior of glass and glass-ceramic products having the compositions shown in Table I is visually observed by exposure of the products to radiation from a mercury lamp, containing activating 2537 A ultraviolet radiation, for a five minute interval. The optical bleaching and thermal fading rates of the products to their clear or undarkened states are normally low, and the time intervals for fully recovery from ultraviolet darkening are not measured. However, the recoveries are complete and photochromic darkening and fading are apparently not subject to fatigue in these systems.

Induced fluorescence in the products is observed by first activating each sample with 2537 A radiation by exposure to the mercury lamp for up to thirty minutes. This treatment sensitizes the product so that it fluoresces during subsequent exposure to 3660 A radiation.

Table II below sets forth properties for glass and glass-ceramic articles having compositions corresponding to those set forth in Table I, produced as hereinabove described. Included are qualitative descriptions of the photochromic darkenability and fluorescent properties of the glass and glass-ceramic products, the crystallizing heat treatments utilized in converting the glass products to the glass-ceramic state, and the physical appearance of the glass-ceramic products so produced. Samples showing a positive photochromic response and/or induced fluorescence under 3660 A irradiation are designated (+), whereas samples exhibiting no response to irradiation are designated (0).

TABLE II

| Example No. | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Photochromic Response (glass) | 0 | 0 | + | 0 | 0 | + | 0 | 0 | 0 | 0 | + | + | 0 | 0 | 0 |
| Fluorescence (glass) | 0 | 0 | + | 0 | 0 | + | 0 | 0 | 0 | 0 | + | + | 0 | 0 | 0 |
| Crystallizing Heat Treatment | All samples are heated at 600°C. for 4 hours followed by 800°C. for 4 hours. | | | | | | | | | | | | | | |
| Glass-ceramic Appearance | All samples have white, opal appearance | | | | | | | | | | | | | | |
| Photochromic Response (Glass-ceramic) | + | + | + | + | + | + | + | + | + | + | + | + | + | + | + |
| Fluorescence (Glass-Ceramic) | + | + | + | + | + | + | + | + | + | + | + | + | + | + | + |

The data set forth in Tables I and II above clearly illustrate the extremely wide range of substitutions into the sodalite-related $Na_2O$—$Al_2O_3$—$SiO_2$—$Cl$ composition system which may be undertaken in accordance with the present invention. Hence neither silica nor alumina comprise essential constituents of these compositions. Most surprisingly, photochromic products free of chlorine and containing fluorine as the single selected halogen constituent have been produced.

Table I also illustrates that the additon of limited quantities of other conventional glass constituents without loss of photochromic properties in these systems is possible. Thus the compositions may optionally include 0–15% $B_2O_3$ to improve melting characteristics and 0–10% total of oxides selected from the group consisting of CdO and ZnO which diminish the brown coloration of the photochromic glass.

While glasses consisting essentially of the foregoing optional constituents in combination with the essential oxide, halogen, and electron donor constituents previously described are preferred, further additions of conventional oxides for known purposes are permitted. Thus our compositions may additionally include minor amounts of conventional nucleating agents such as $TiO_2$ and $ZrO_2$. Also, limited quantities of the alkaline earth metal oxides CaO, MgO and SrO may be added, but the addition of these oxides must be limited to quantities which will not substantially modify the crystallization characteristics of the glass. Thus, excessive additions of the alkaline earth metal oxides can result in the formation of non-photochromic crystal phases in the glass, rather than the desired photochromic sodalite and related crystal phases.

Particularly preferred compositions for the manufacture of photochromic articles in accordance with the invention are those consisting essentially, in weight percent as calculated from the batch, of about 31–35% $SiO_2$, 26–30% $Al_2O_3$, 26–30% $Na_2O$, 0–10% $B_2O_3$, 4–7% F and 1–5% $SO_3$.

We claim:

1. A glass composition useful for the production of photochromic glass and glass-ceramic articles which consists essentially of, in weight percent as calculated from the batch, about 17–34% total of alkali metal oxides, essentially including $Na_2O$, selected in the indicated proportion from the group consisting of 12–33% $Na_2O$, 0–20% $K_2O$, and 0–7% $Cs_2O$; 17–33% total of modifying oxides selected from the group consisting of $Al_2O_3$ and $Ga_2O_3$; 22–54% total of network-forming oxides selected in amounts not exceeding the indicated proportions from the group consisting of up to 41% $SiO_2$ and up to 54% $GeO_2$; 2.5–30% total of halogen selected in amounts not exceeding the indicated proportions from the group consisting of up to 9% F and up to 30% Cl; and 1–10% total of constituents selected from the group consisting of $SO_3$, $SeO_2$ and Te.

2. A composition in accordance with claim 1 which further contains 0–15% $B_2O_3$, and 0–10% total of oxides selected from the group consisting of CdO and ZnO.

3. A glass composition in accordance with claim 1 wherein the selected halogen is fluorine.

4. A glass composition in accordance with claim 3 consisting essentially, in weight percent as calculated from the batch, of about 31–35% $SiO_2$, 26–30% $Al_2O_3$, 26–30% $Na_2O$, 0–10% $B_2O_3$, 4–7% F and 1–5% $SO_3$.

* * * * *